United States Patent
Harris

(10) Patent No.: US 9,015,334 B2
(45) Date of Patent: Apr. 21, 2015

(54) MEDIA PLAYER WITH AUTOMATIC STREAMING OF MEDIA FILES

(75) Inventor: Scott C. Harris, Rancho Santa Fe, CA (US)

(73) Assignee: Harris Technology, LLC, Rancho Santa Fe, CA (US)

( * ) Notice: Subject to any disclaimer, the term of this patent is extended or adjusted under 35 U.S.C. 154(b) by 1642 days.

(21) Appl. No.: 11/775,705

(22) Filed: Jul. 10, 2007

(65) Prior Publication Data

US 2009/0100187 A1    Apr. 16, 2009

Related U.S. Application Data

(60) Provisional application No. 60/820,474, filed on Jul. 26, 2006.

(51) Int. Cl.
G06F 15/16  (2006.01)
G06Q 30/02  (2012.01)
H04L 12/28  (2006.01)

(52) U.S. Cl.
CPC ............ *G06Q 30/02* (2013.01); *H04L 12/2812* (2013.01); *H04L 12/2809* (2013.01); *H04M 2250/02* (2013.01); *H04L 2012/2841* (2013.01)

(58) Field of Classification Search
CPC .................. H04L 2012/2841; H04L 12/2812; H04L 12/2809; H04M 2250/02; G06Q 30/02
USPC ...................... 709/231, 217; 707/10
See application file for complete search history.

(56) References Cited

U.S. PATENT DOCUMENTS

| | | | | |
|---|---|---|---|---|
| 7,444,388 B1* | 10/2008 | Svendsen | ...................... | 709/217 |
| 7,483,958 B1* | 1/2009 | Elabbady et al. | ............. | 709/217 |
| 2001/0048749 A1* | 12/2001 | Ohmura et al. | ................. | 381/86 |
| 2004/0148424 A1* | 7/2004 | Berkson et al. | ............... | 709/236 |
| 2004/0236864 A1* | 11/2004 | Stevenson et al. | ............ | 709/231 |
| 2005/0080915 A1* | 4/2005 | Shoemaker et al. | .......... | 709/231 |
| 2005/0169467 A1* | 8/2005 | Risan et al. | ................... | 380/201 |
| 2005/0210101 A1* | 9/2005 | Janik | ............................ | 709/203 |
| 2006/0041561 A1* | 2/2006 | Singer et al. | ..................... | 707/10 |
| 2006/0161621 A1* | 7/2006 | Rosenberg | .................... | 709/204 |
| 2006/0168351 A1* | 7/2006 | Ng et al. | ....................... | 709/248 |
| 2006/0173972 A1* | 8/2006 | Jung et al. | ..................... | 709/217 |
| 2006/0236243 A1* | 10/2006 | Brain et al. | ................... | 715/704 |
| 2006/0242259 A1* | 10/2006 | Vallabh et al. | ................ | 709/217 |
| 2006/0242681 A1* | 10/2006 | Brain et al. | ................... | 725/109 |
| 2006/0258289 A1* | 11/2006 | Dua | ............................ | 455/41.3 |
| 2007/0016654 A1* | 1/2007 | Bowles et al. | ................ | 709/217 |
| 2007/0038514 A1* | 2/2007 | Patterson et al. | ............... | 705/14 |
| 2007/0055743 A1* | 3/2007 | Pirtle et al. | .................... | 709/217 |
| 2007/0142024 A1* | 6/2007 | Clayton et al. | ................ | 455/403 |

\* cited by examiner

*Primary Examiner* — Krista Zele
*Assistant Examiner* — James Forman
(74) *Attorney, Agent, or Firm* — Law Office of Scott C. Harris, Inc.

(57) ABSTRACT

A media streaming device which automatically senses the proximity of an auxiliary media player such as a digital picture frame or digital audio device, and automatically streams media information from the media streaming device to the auxiliary media player. Permissions can be set so that only some files are sent to the auxiliary media player, based on user specified permissions and/or based on copyright restrictions.

14 Claims, 2 Drawing Sheets

MEDIA PLAYER WITH AUTOMATIC STREAMING OF MEDIA FILES

This application claims priority to Provisional application Ser. No. 60/820,474, filed Jul. 26, 2006, the contents of which are expressly incorporated by reference.

BACKGROUND

Many different kinds of personal media players are known. As of the writing of this document, the iPod is perhaps the most ubiquitous personal media player. IPods are known which can play sound media (for example MP3s) and also show videos and pictures. However, other kinds of personal media players are also achieving wider acceptance. Many of the GPS devices in automobiles enable playing media; and/or cellular telephones also include the capability of playing media. Other portable and non-portable devices may also have analogous capabilities, e.g., PDAs with and without wireless, Internet appliances, e-mail devices such as blackberries, laptop computers and other devices.

A typical way of using such personal media player is by using a playing program which stores a library of the media that is the transferred to the device or removed from the device and stored in a database that allows recovery and/or playing of the media. For example, the program may have a database of MP3 files. A new MP3 file is added to the device by adding it to the program's work area, and the program then syncs the file on to the portable device. As the device fills, it may be desirable to remove MP3s from the device, and this can also be done using the program.

The media device can be controlled in other ways, e.g., directly over a user interface. While the above describes operation with MP3s, it should be understood that this same operation is also carried out with image files, e.g. JPEGs, and with video files.

SUMMARY

The present specification describes transferring media files to a media device, of sharing media files, of maintaining copyright issues, and customizing media files based on advertising content.

BRIEF DESCRIPTION OF THE DRAWINGS

These and other aspects will now be described in detail with reference to the accompanying drawings, in which.

DETAILED DESCRIPTION

One major concern with media playing devices is the issue of copyright of the media, where media can include music, sounds, video, and/or audio or other perceivable information. For example, MP3 songs are often copyrighted. Illegal copies may deprive the copyright owner of certain royalties. Many copyright owners have found ways to charge for the copying of the media to the device, to derive some royalty in this way from their copyrighted material. Illegal copying of copyrighted media, especially from one device to another, however, becomes a major concern.

However, some media may be free from copyright restrictions. This may be the case for personal type media where the user wants to allow the media to be shared with others. For example, take the case of personal photographs. If you take a photograph of your family, you may have a copyright in the image, but you certainly want to be able to share that with other members of your family so that they can see it. Other media, such as movie trailers, movie posters and advertisements may be shareable under a similar rationale—that even though there is a copyright, you want everyone to be able to share that media, that is you want the movie trailers and other advertising type items to be shareable with everyone. You want as many people as possible to share that kind of media.

Another special kind of media is described herein as alternative embodiments: specifically this media including embedded advertising, so that simply perceiving the media carries out the producer's desire to provide a certain kind of advertising.

Certain embodiments may allow the media to be shared between different units. On the iPod, for example, certain media can be shared using either a "Podcast" or by allowing the media to be copied from the iPod to a computer. A special device is described herein, and shown in FIG. 1, which allows media to be streamed directly from the media player to a channel that connects to either the Internet, or to another media player, or to some storage unit. According to the present system, a technique is described which enables defining some files as being shareable, defining other files as being restricted, or copyright protected, and protecting those files which are restricted or copyright protected so that those files cannot be improperly copied over the channel. However, other files, which are not copyrighted, or which are shareable freely, can be shared between a user's media player, and any other media player.

Figure 1:
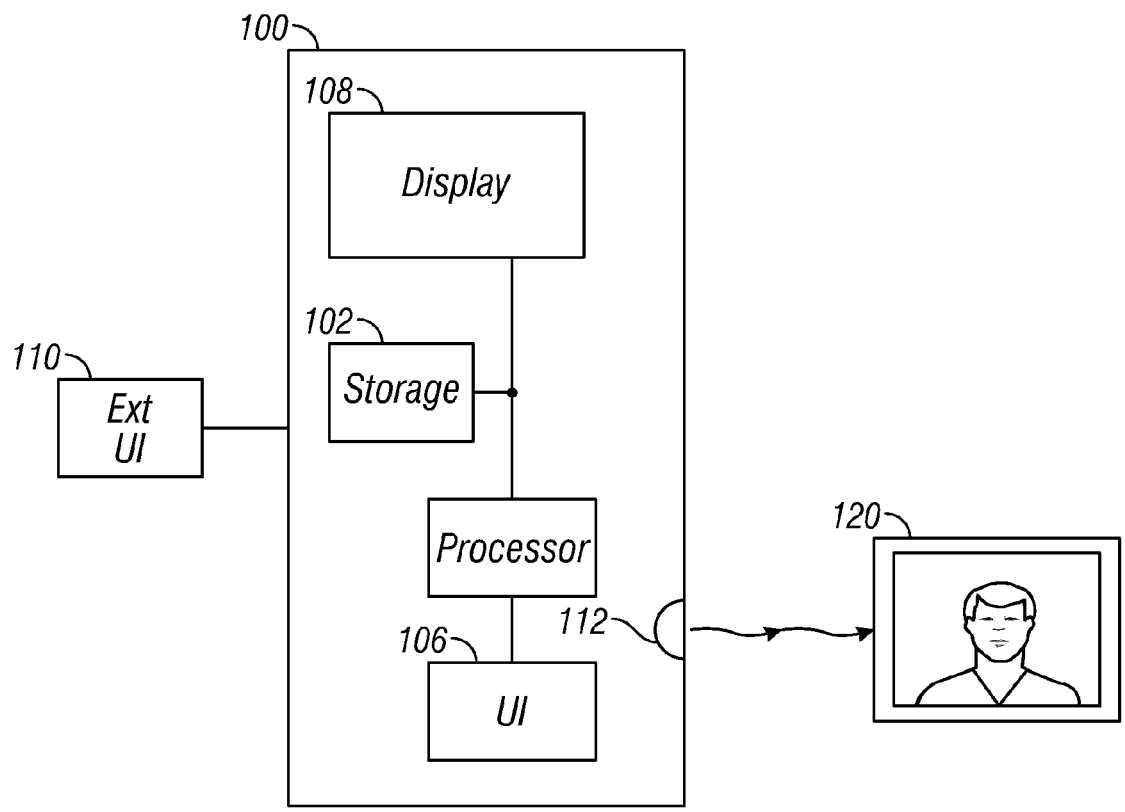
FIG. 1 shows an embodiment that streams information from a personal media player to a receiver.

FIG. 1 shows an embodiment in which the media player 100 includes a storage area 102 for storage of media. The storage area 102 may be, for example, a miniature hard drive, or flash memory, or any other memory part that stores information. The device 100 also includes a user interface 106 which may be for example the controlling wheel of an iPod, and includes a display 108. The display may display information from the user interface actuations, and may also display pictures and videos. The display may also be a touchscreen. An external user interface 110 may also be connected to an external port which may be a wired or wireless ports such as Bluetooth. In addition, a network connection 112 connects to a network, which may be a wired or wireless network, and may be a peer-to-peer or point to point network. The connection between the user's media player 100 and other media players may be over a network, such as the Internet, and may be via download, peer-to-peer transfer, or other connections. The peer-to-peer transfer may direct from one unit to the other, or through a network such as the Internet acting as a conduit.

An embodiment uses a connection to each of multiple portable media players. The connection can be a wired connection, or it can be a wireless connection. In an embodiment, the connection is slow, and updates as a background process. In this embodiment, the connection is not fast enough to stream the actual media. For example, this may allow updating of movies in the background during times when the media player is not being used, or at other analogous times.

In addition, device may support streaming, wired or wireless, to an associated media device such as 120. For example, the device 100 may be used to display pictures or videos and may support data transfer to a digital picture frame, or to an external video display, for example. In that case, the associated device 120 may be such a digital picture frame or display. The term "playing" is used herein to denote playing the media, e.g., playing the sound, displaying the images/photos, and/or playing the video.

An aspect may sense the proximity of an associated media device, and support wireless streaming thereto, called herein "proximity streaming". The sensing may, for example, send out polls and see if any responses are received from appropriate devices. It may look for wireless signatures of appropriate devices. In the wireless internet embodiment, it may simply look for a wireless Ethernet connection. The wireless streaming can be via wireless ethernet, or alternatively can be via Bluetooth or some other limited range protocol.

The proximity streaming is very different than communication protocols which may be used by the device. Communications protocols attempt to find a communication channel over which to communicate. For example, when the media device 100 includes cellular capability, the cellular is intended to always be within one cell of a network. Proximity streaming uses a limited range streaming technique, but does so only when some device is within range.

The media may be stored with a streaming attribute that sets whether the file is one which should be automatically streamed to an associated playing device in range. A type attribute may specify what type of device needs to be in range before streaming. For example, a family picture may be set as one which is automatically streamed to a digital picture frame device. A person's favorite song, or jingle may be automatically streamed to an MP3 device in range. Other more private pictures may be set as 'do not stream', and may therefore not be sent to associated devices.

A priority among the media may also be set. For example, one picture may be set as the one which is always the one that is sent to the associated device. When an associated device is detected to be in range, the associated device detects whether there are any files of the specified form. The files, when downloaded, may have another attribute which includes the proximity sensing.

The media can also have an attribute that allows it to only stream to associated devices with certain owners. For example, files can be streamed to public devices, or to devices having the owner name "Harris", or only to devices having the owner name "Scott Harris'.

Figure 2:
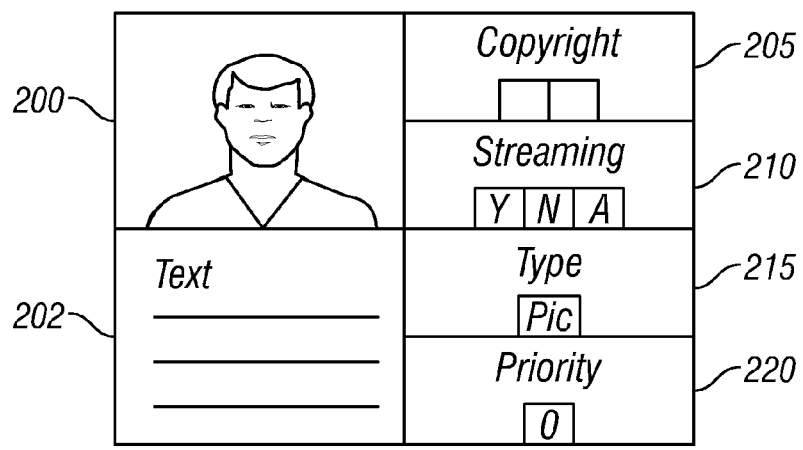
FIG. 2 shows a file format.

FIG. 2 illustrates a an exemplary user interface which can be used with a picture. The picture shown as 200 is displayed a portion of the user interface, along with some additional explanatory information. The copyright information, indicating whether the picture is either protected or unprotected, may also be displayed at 205. For most media, copyright will not be a user selectable option. The media is obtained with an embedded copyright code, that may include an encrypted portion. For example, the media may be encrypted in a way that can only be decrypted based on the proper copyright code being used. The media can be sent in such a way that prevents the copyright code from being transferred to any other unit. The encrypted copyright may also set allowable options for the streaming, e.g., prevent streaming.

Other techniques of encrypting the copyright may also be used. In some cases, the copyright code may also be user selectable, so that a user may set the copyright status or mode on one of their own personal pieces of media.

The streaming option 210 indicates the different possibilities for streaming the file to an external device. Streaming being yes allow the media to be streamed to an external player, and/or an external media device. The streaming can be "no" to prevent all streaming. Streaming can be "auto" to automatically allow streaming. It can be "manual" to only allow manual streaming.

The media type 215 sets what kind of player may play the device. For example when the media type is set to picture, only a player which can display a picture will play the media.

Priority at 220 sets the priority from among the streaming. For example, a lower priority number may be less likely to be streamed at any time.

The file attributes 202, 205, 210, 215, 220 are associated with the file, but might not be displayed or played.

Therefore, if one obtains a specified picture, for example, a picture of one's family, presumably, there will be no copyright "restrictions". One can set the streaming as enabled, and sets the priority as "high". Proximity sensing may be enabled so that whenever the media device comes within range of an appropriately enabled digital picture frame, the device automatically begins streaming the picture to the picture frame, so that picture frame automatically displays it.

Another aspect relates to the way in which advertising may be displayed to users. Advertising to a captive audience typically uses a very concentrated technique, in which a dedicated advertisement is displayed to a user. Presumably the user sits and watches that advertisement.

This is the conventional way that television has aimed advertisements at audiences. However, digital video recorders allow users to fast-forward over the commercials. This limits the effectiveness of the commercials, and has caused advertisers to seek an alternative way of aiming the advertisements at the users.

One way of displaying these advertisements includes the advertisement content as a portion of the television program. For example, suggestive advertising may be used, based on subliminal signals that may be sent, or brand names on items used by the actors may actually form a subtle form of the advertisement. However, too much advertisement can annoy the users, and actually harm sales.

Advertisement has also been used on Internet sites. The advertisement can be for example in the form of banners, or side windows, or the like. Again, however, too much advertisement can annoy the users. If a site appears to be all advertising, the users may simply decide not to frequent that site.

An aspect describes a more subtle form of advertising, which can be associated with content, and can be displayed on various content to delivery devices. One aspect is advertisement which can be displayed on a personal media player, either as dedicated advertisement, or more preferably by customizing the content which is displayed on the media player to show advertising that is customized to the user's individual desires. Another aspect relates to an advertisement which forms a portion of the media being played, where that portion can be changed in various ways. One portion which can be changed is by a customization, and another portion may be changed to reflect a different advertiser. These media can be displayed on a personal media player, a television, or any other device that can display or show any kind of media.

Figure 3:
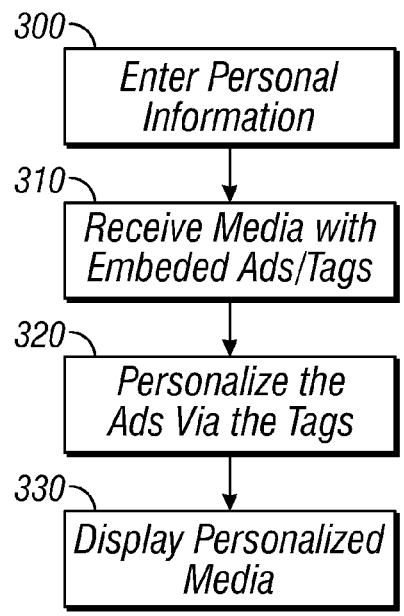
FIG. 3 shows a flowchart of operation of an embodiment that personalizes media for ads.

FIG. 3 illustrates a flowchart of an exemplary process that can be carried out. At 300, the user enters personal information. This information may be entered at a startup of the media player, into a television, into a computer, or the like. As an alternative, the personal information may be deduced by the player based on, for example, the geographic location, or can be determined based on demographics of the type of media which is played.

Figure 4:
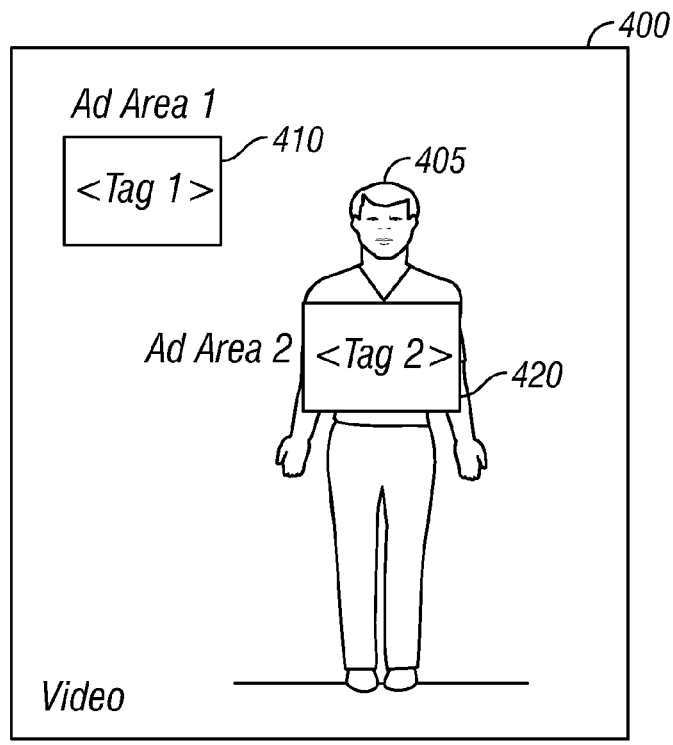
FIG. 4 shows an exemplary screen showing a frame of a video with replaceable tags

At 310, the media player receives a media with embedded tags. FIG. 4 illustrates a screenshot of a video clip that includes the embedded media tags. The video has a number of parts, and the overall video frame 400 shows a person 405, within the overall scene. A first ad area 410 is shown as a blank box, and this may be for example a sign within the video frame, or alternatively may be a prop which will be used by the person, such as a telephone or automobile, or the like. The area 410, however, is represented by a tag, shown as tag 1, which will be filled in with the specifics of the item that will be shown in the area.

Another ad area to be shown is 420. This may represent the clothing worn by the person. According to an aspect, the person's clothing may be customized according to the contents of the preferences. This may use well-known techniques of modifying an image or video to include specific clothing thereon. Other tags can also be located in different places. In operation, the tags can represent blank areas in the media, so that if the media were shown without any tag information, they would either be blank, or have some default value or look. The tags can be modified to show different automobiles, or other branded items. For example, tag 1 could represent a Cadillac or a Toyota depending on the tags.

At 320, the ads are personalized via the tags. This can be based on the personal information, and also the tags can be personalized based on who pays for the advertising revenue.

The media can be any media that is received by the media player. For example, the media may be movies or short movie clips, movie portions or previews, or the like. It can be pictures of various items, and can also be sounds. In the embodiment, the tag can be a picture part. As shown, the tag can be an area, can be a background, or can be clothes worn by a person. In the case of clothing, the tag may represent an item of clothing, and may include very conspicuous labels so that the viewer sees the label on the clothes and receives a subliminal hint of those clothing. In the case of a background, the tag can be a color scheme or texture that is associated with some advertiser.

The tag can also be a watermark or background, causing the user to see the background.

The tag can be a texture or color scheme, especially where the color scheme is a very recognizable color scheme. Recognizable color schemes have been associated with various vendors.

For a sound, the tag can be a part of the sound, a background sound, or a voice profile. For example, in a voice modelling system, a profile may be used to make the sound have certain tonal characteristics, or perhaps to use a certain celebrity's voice. The voice characteristics may be tailored to the age/sex/demographics of the user.

The customization need not be to an individual user, it can be based on revenue—e.g., who paid for the ad, based on season, e.g., Christmastime customization, and the like.

This system allows customizing a media item being played by a media player, thereby effectively placing subtle advertising on the media that is played by that media player.

The general structure and techniques, and more specific embodiments which can be used to effect different ways of carrying out the more general goals are described herein.

Although only a few embodiments have been disclosed in detail above, other embodiments are possible and the inventor(s) intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other media types and other media players can be used.

Also, the inventor(s) intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The computer may be a Pentium class computer, running Windows XP or Linux, or may be a Macintosh computer. The computer may also be a handheld computer, such as a PDA, cellphone, or laptop.

The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

What is claimed is:

1. A method, comprising:

storing a plurality of media files in a storage unit;

enabling carrying out an action that allows playing the media files;

storing at least one attribute associated with each of the plurality of the media files; and based on a first of said at least one attributes, selectively determining whether a media file can be sent to an associated media playing device, where said associated media playing device is separate from the storage unit that stores the plurality of media files, wherein a first value of said first attribute indicates that the media file can be sent to said associated media playing device at any time, and allows the media file to be sent at any time, and a second value of said first attribute indicates a do not send at any time indication, and prevents the media file from being sent to said associated media playing device at any time;

where a first plurality of said files include said first attribute having said first value allowing that first plurality of files to be sent, and a second plurality of said files include said first attribute having said second value preventing that second plurality of files from being sent;

based on a second of said attributes, determining which of said first plurality of files to send at a first time, where said second attribute represents a priority of sending files and where a higher priority file is more likely to be sent than a lower priority file;

automatically determining a connection from said storage unit to said media playing device in response to a wireless connection to said media playing device;

automatically sending a first file to said media playing device when the connection to the media playing device is detected by said automatically determining, said first file being selected as one that has the first value of said first attribute and being selected based on a priority set by said second attribute, and where said automatically sending causes said associated media playing device to play said first file automatically, responsive to receipt, without user interaction being necessary to play the media file; and storing a third file attribute associated with the file which specifies ownership characteristics of the file, further comprising detecting an owner name of said media playing device and comparing the owner name as detected with authorized owner name in said third file attribute and automatically sending said first file to the media playing device found by said automatically detecting if said comparing determines the owner name of said media playing device matches with said authorized owner name in said third file attribute, and not sending said first file if said owner name of said media playing device does not match with said authorized owner name in said third file attribute.

2. A method as in claim 1, wherein said wireless connection is a proximity connection.

3. A method as in claim 2, wherein said media playing device is connected to the Internet, and wherein said automatically sending comprises streaming over an Internet connection.

4. A method as in claim 1, wherein the media files are at least one of video files, image files, or audio files.

5. A method as in claim 1, further comprising another attribute which is a copyright attribute that determines whether the media file can be sent to another device.

6. A method as in claim 5, wherein said copyright attribute is stored in an encrypted form.

7. A method comprising:
storing a plurality of media files in a media playing unit, where said media playing unit enables selecting a media file for playing, and said media playing unit carries out at least one of providing audio and/or pictures and/or video from the media playing unit to a user;
automatically detecting a wireless connection to an external playing unit within range of said media playing unit, wherein said detecting detects that the external playing unit is one that can play the at least one of audio and/or pictures and/or video;
and
automatically sending a file to the media playing unit found by said automatically detecting based on a priority of sending stored associated with said file, where a higher priority file is more likely to be sent than a lower priority file, said automatically sending causes said external playing unit to play the file representing at least one of audio and/or pictures and/or video responsive to receipt and without user interaction, wherein said storing comprises storing at least one attribute associated with at least a plurality of the files, and said automatically sending is based on a value of said at least one attribute,
based on a first of said at least one attributes, selectively determining whether a media file can be sent to an associated media playing device, where said associated media playing device is separate from the storage unit that stores the plurality of media files;
wherein a first value of said first attribute allows the file to be sent at any time, and a second value of said at least first attribute prevents the file from being sent at any time, and said automatically sending causes said external playing unit to play the at least one of audio and/or pictures and/or video responsive to receipt and without user interaction,
and wherein each of said files also includes a priority attribute, and said automatically sending determines which of said files to send at a given time based on a priority of sending the files and where a higher priority file is more likely to be sent than a lower priority file and
storing another file attribute which specifies ownership characteristics of the file, wherein said selectively determining is based on both said at least one attribute and said another file attribute, and allows the media file to be sent to the media playing unit only when ownership information of the media playing unit is allowed by said ownership information of the file, by detecting owner name of said media playing unit and comparing the owner name as detected with authorized owner name from said another file attribute, and automatically sending the file to the media playing unit found by said automatically detecting if said comparing determines the owner name matches with said authorized owner name, and not sending said file if said owner name does not match with said authorized owner name.

8. A method as in claim 7, wherein said external playing unit is connected to the Internet, and said sending said at least one file comprises sending over the internet.

9. A method as in claim 7, wherein said wireless connection is a proximity connection.

10. A method as in claim 7, wherein said at least one attribute includes a copyright attribute that determines whether the file can be sent to another device.

11. A method as in claim 10, wherein said copyright attribute is stored in an encrypted form.

12. An apparatus comprising:
a media player device, having a storage unit that stores media files, and a player that allows playing the stored media files;
said media player device automatically connecting to a remote file storage device in response to a wireless connection to said remote file storage device and automatically receiving a file from said remote file storage device, where said file has at least one attribute;
based on a first of said at least one attributes, selectively determining whether a media file can be sent to an associated media playing device, where said associated media playing device is separate from the storage unit that stores the plurality of media files;
wherein said receiving receives a first file automatically which has a first value of said first attribute which allows the media file to be sent by said remote file storage device at any time, and not receiving a second file which has a second value of said at least first attribute that prevents the media file from being sent to the media player device at any time;
said media player device automatically playing said first file, responsive to receipt without user interaction necessary to play said first file,
wherein said first file including at least one file with said first value of said at least one attribute and at least one file with said second value of said one attribute,
and wherein each of said files also includes a priority attribute, and said media player device is more likely to receive a higher priority file than a lower priority file,
and wherein said remote file storage device stores another file attribute which specifies ownership characteristics of the media file, and wherein said remote file storage device operates based on both said at least one attribute and said another file attribute, and allows the media file to be sent to the media playing device only when ownership information of the media playing unit is allowed by said ownership information of the file, by detecting an owner name of said media playing unit and comparing the owner name as detected with an authorized owner name from said another file attribute, and automatically sending the file to the media playing unit found by said automatically detecting if said comparing determines the owner name matches with said authorized owner information, and not sending said file if said owner name does not match with said authorized owner name.

13. An apparatus as in claim 12, wherein said media player device is connected to the Internet, and wherein said first file is automatically sent over the Internet connection.

14. An apparatus comprising:

a media player device, having a storage unit that stores media files, and a player that allows playing stored media files; and a file sending part, operating to detect an associated media player device that is wirelessly connected with said media player device, wherein said associated media player device is separate from the media player device, to send automatically some, but not all of said media files to said associated media playing device that has been detected to be wirelessly connected, wherein each of a plurality of said media files include an associated permission attribute, wherein a first value of said attribute causes the media file to be sent to said associated media playing device, and a second value of said at least one attribute prevents the media file from being automatically sent to the associated media playing device, where said associated media playing device is separate from the storage unit that stores the plurality of media files;

wherein a first value of said first attribute indicates that the media file can be sent to said associated media playing device at any time, and allows the media file to be sent at any time, and a second value of said first attribute indicates a do not send at any time indication, and prevents the media file from being sent to said associated media playing device at any time;

and where said media file that is sent to said associated media playing device is automatically played by said associated media playing device without user interaction on said associated media playing device, wherein each of said media files also includes an owner information attribute;

said file sending part detecting an owner name of said associated media playing device and comparing the owner name as detected with authorized owner name information in said owner information attribute and automatically sending said media file to the media playing device found by said automatically detecting if said comparing determines the owner name of said media playing device matches with said authorized owner name information in said owner information attribute, and not sending said media file if said owner name of said media playing device does not match with said authorized owner name information in said owner information attribute, and wherein each of said media files also includes a priority attribute, and said file sending part determines which of said files to send at a given time based on a priority of sending the files and where a higher priority file is more likely to be sent than a lower priority file.

* * * * *